(12) United States Patent
Parker et al.

(10) Patent No.: US 7,368,674 B2
(45) Date of Patent: May 6, 2008

(54) COMPACT INTEGRAL ROTATIONAL DRAWOUT STOP DEVICE WITH LINEAR PERMISSIVE

(75) Inventors: Paul Kimball Parker, Wexford, PA (US); Ronald Dale Hartzel, Butler, PA (US); James Edward Smith, Pittsburgh, PA (US); Paul Anthony Colbaugh, Allison Park, PA (US); Ronald Alan Carder, Pittsburgh, PA (US); Marcy Dawn Scialabba, Monaca, PA (US)

(73) Assignee: Eaton Corporation, Cleveland, OH (US)

( * ) Notice: Subject to any disclaimer, the term of this patent is extended or adjusted under 35 U.S.C. 154(b) by 46 days.

(21) Appl. No.: 11/536,965

(22) Filed: Sep. 29, 2006

(65) Prior Publication Data

US 2008/0078659 A1 Apr. 3, 2008

(51) Int. Cl.
*H01H 9/20* (2006.01)
(52) U.S. Cl. .................... 200/50.21; 200/50.23
(58) Field of Classification Search ... 200/50.21–50.24
See application file for complete search history.

(56) References Cited

U.S. PATENT DOCUMENTS

| | | | | |
|---|---|---|---|---|
| 3,790,861 A | * | 2/1974 | Sakats | 361/609 |
| 4,002,864 A | * | 1/1977 | Kuhn et al. | 200/50.21 |
| 4,017,698 A | * | 4/1977 | Kuhn et al. | 200/50.21 |
| 4,728,757 A | * | 3/1988 | Buxton et al. | 200/50.21 |
| 4,931,907 A | * | 6/1990 | Robinson et al. | 361/727 |
| 5,357,068 A | * | 10/1994 | Rozier | 218/44 |
| 5,486,663 A | * | 1/1996 | Fritsch et al. | 200/50.21 |
| 6,545,234 B1 | * | 4/2003 | Trivette et al. | 200/50.21 |
| 6,689,968 B2 | * | 2/2004 | Trivette et al. | 200/50.21 |
| 6,838,626 B2 | * | 1/2005 | Deylitz et al. | 200/50.21 |

\* cited by examiner

*Primary Examiner*—Michael A Friedhofer
*Assistant Examiner*—Lisa Klaus
(74) *Attorney, Agent, or Firm*—Martin J. Moran

(57) ABSTRACT

A stop device for an electrical device cell includes a generally flat, rectangular stop member and a generally flat, elongated permissive member. The stop member is, preferably, part of a stop member assembly that includes a biasing device. The cell includes a pair of rails upon which a drawout electrical device is movably disposed. The stop member is disposed adjacent to at least one housing assembly rail and is structured to move between a first, extended position, wherein the stop member engages the drawout electrical device and prevents the drawout electrical device from moving from the first, installed position to the second, drawn out position, and a second, withdrawn position, wherein the stop member does not engage the drawout electrical device and the drawout electrical device may move from the first, installed position to the second, drawn out position.

19 Claims, 5 Drawing Sheets

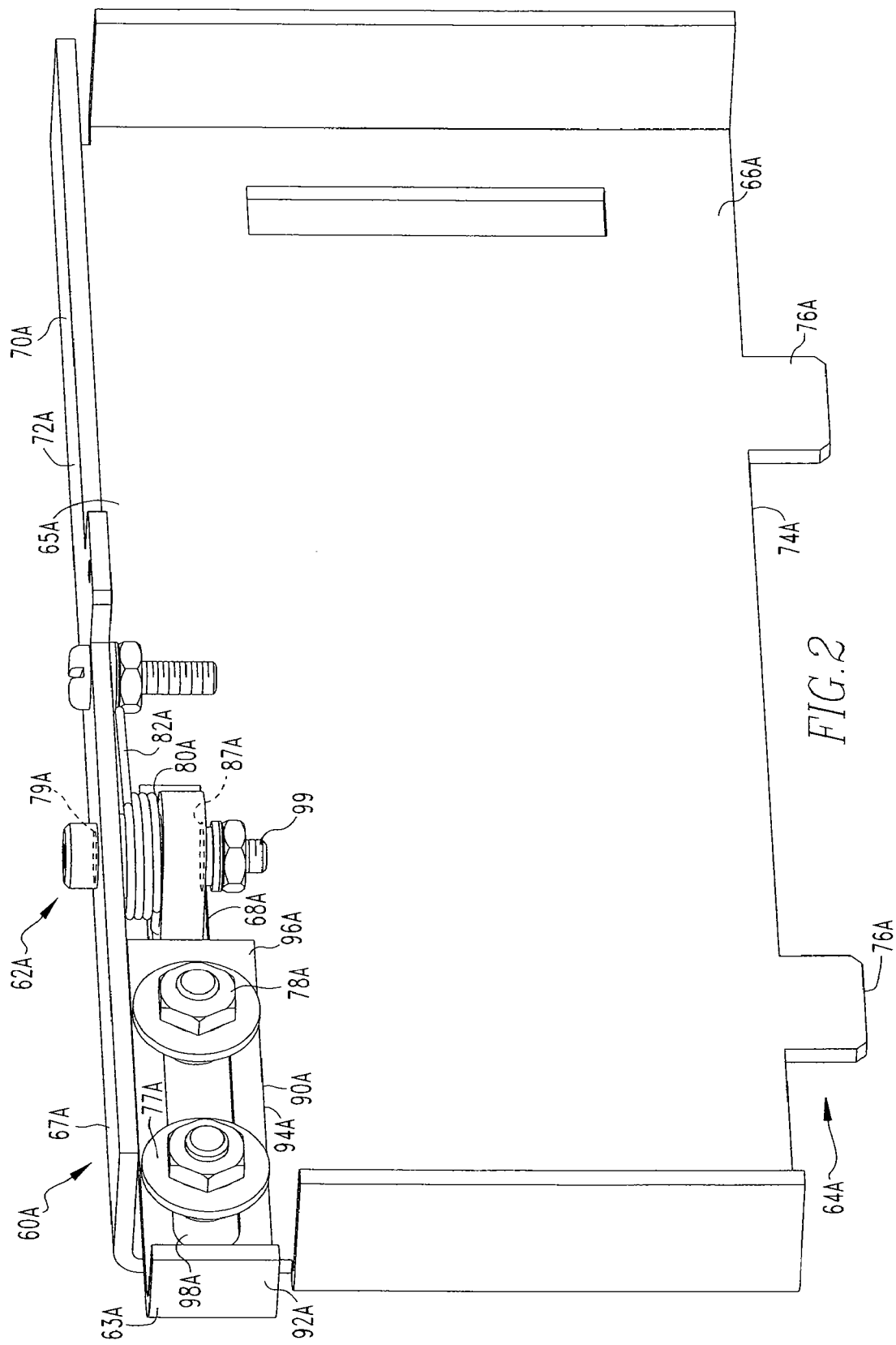

COMPACT INTEGRAL ROTATIONAL DRAWOUT STOP DEVICE WITH LINEAR PERMISSIVE

BACKGROUND OF THE INVENTION

1. Field of the Invention

The present invention relates to a cell for a drawout electrical device and, more specifically to a stop device structured to prevent the drawout electrical device from being removed from the cell if the rail extension assemblies are not properly coupled to the cell.

2. Background Information

Drawout devices, such as, but not limited to, large circuit breakers, are typically disposed in a cell having one or more electrical bus members and a housing assembly. The drawout device, which may weigh as much as 1,000 lbs., is typically disposed on a set of rollers, or a frame having rollers. The rollers are structured to engage a pair of rails extending from the front to the back of the housing assembly. To remove the circuit breaker from the housing assembly a rail extension assembly is coupled to the housing assembly. The rail extension assembly may be a generally independent assembly coupled only to the housing assembly, or, the rail extension assembly may be incorporated into a movable cart. The rail extension assembly includes two rails having, generally, the same cross-sectional dimensions and spacing as the housing assembly rails. The rail extension assemblies, typically, have a length similar to the housing assembly rails. When installed on the housing assembly, the rail extension assembly is aligned with the housing assembly rails and form a substantially continuous track. In this configuration, the drawout device may be moved, that is, rolled along the track, between a first, installed position and a second, drawn out position.

The rail extension assembly may be a generally independent assembly coupled only to the housing assembly, or, the rail extension assembly may be incorporated into a movable cart. That is, an independent rail extension assembly may be coupled to the cell housing assembly to allow the drawout device to be removed from the cell for repair or testing. A rail extension assembly incorporated into a movable cart could be used to remove of the drawout device.

In order to safely remove the drawout device from the housing assembly, the rail extension assembly must be in the proper position, that is, with the rail extension assembly rails substantially aligned with the housing assembly rails. To ensure that a rail assembly is in the proper position, interlock devices have been incorporated into drawout device cells. Such interlock devices tend to be overly complex in their construction and manufacture. That is, the prior art interlock devices had complex shapes and multiple moving components. Additionally, such interlock devices were incorporated into the design of the cell and, as such, cannot be incorporated into cells having a different design or pre-existing cells.

There is, therefore, a need for a simplified stop device structured to prevent the drawout device from moving between the first, installed position and the second, drawn out position. There is a further need for a stop device structured to allow a drawout device to be installed without having a rail extension assembly in place, but which prevents the removal of the drawout device unless a rail extension assembly is in place. There is a further need for a stop device assembly that may be easily incorporated into existing drawout device cells.

SUMMARY OF THE INVENTION

These needs, and others, are met by at least one embodiment of the disclosed invention which provides a stop device that, in the simplest form, includes a generally flat, rectangular stop member and a generally flat, elongated permissive member. The stop member is, preferably, part of a stop member assembly that includes a biasing device. The stop member is disposed adjacent to at least one housing assembly rail and is structured to move between a first, extended position, wherein the stop member engages the drawout electrical device and prevents the drawout electrical device from moving from the first, installed position to the second, drawn out position, and a second, withdrawn position, wherein the stop member does not engage the drawout electrical device and the drawout electrical device may move from the first, installed position to the second, drawn out position. The stop member, however, further allows the drawout electrical device to be installed without having a rail extension assembly in place. That is, during the installation of a drawout electrical device, the drawout electrical device may directly engage the stop member and move the stop member into the second, withdrawn position thereby allowing the drawout electrical device to be installed.

Generally, the stop member is biased by the biasing device to the first, extended position. The permissive member is structured to be engaged by the rail extension assembly when the rail extension assembly is properly coupled to the housing assembly. The permissive member is further structured to move between a first position, wherein the permissive member does not effect the position of the stop member, and a second position, wherein the permissive member overcomes the bias of the biasing device and move the stop member into the second, withdrawn position. Thus, when the rail extension assembly is properly coupled to the housing assembly, the permissive member is moved to the permissive member second position thereby moving the stop member into the stop member second, withdrawn position. With the stop member in the second, withdrawn position, the drawout electrical device may move from the first, installed position to the second, drawn out position.

In one embodiment the stop member assembly and permissive member are coupled to a mounting assembly. The mounting assembly is also of a simplified construction starting as a generally flat, rectangular plate. The mounting assembly plate, preferably, has an opening and at least one bent edge. The bent edge acts as a standoff structured to space the plate from the housing assembly components. The mounting assembly plate is disposed immediately adjacent to the outer edge of at least one housing assembly rail. The stop member, permissive member and biasing device are coupled to the mounting assembly plate on the side opposite the housing assembly rail with the stop member structured to move through the opening. In this configuration, the stop member may engage the drawout device while protected by the plate. Further, the combination of the stop member, permissive member, biasing device and mounting assembly form a stop device assembly that may be easily installed in pre-existing drawout device cells.

BRIEF DESCRIPTION OF THE DRAWINGS

A full understanding of the invention can be gained from the following description of the preferred embodiments when read in conjunction with the accompanying drawings in which:

FIG. 2 is an isometric view of a stop device assembly.

DESCRIPTION OF THE PREFERRED EMBODIMENTS

As used herein, "coupled" means a link between two or more elements, whether direct or indirect, so long as a link occurs.

As used herein, "attached" means that two elements are directly in contact with each other.

As used herein, directional terms, e.g. "above," "below," "upper," "lower," etc., are used for convenience relative to the Figures and are not intended to limit the claims.

It is further noted that many elements shown in the Figures are symmetrical about a centerline extending in the direction of travel of the drawout electrical device 12. As such, similar elements on opposite sides of the centerline shall use similar reference numbers but will be distinguished from each other by using the letters "A' and "B." Each element followed by the letter "A" is on one side of the centerline and each element followed by the letter "B" is on the opposite side of the centerline.

The following description shall be addressed to a stop device assembly 60A, described below. However, it is further understood that a stop device, that is, the functional components of the stop device assembly 60A, such as, but not limited to, the stop member assembly 62A and the permissive member 63A, may be coupled directly to the housing assembly 14 as shown in FIGS. 1A and 1B.

Figure 1A:
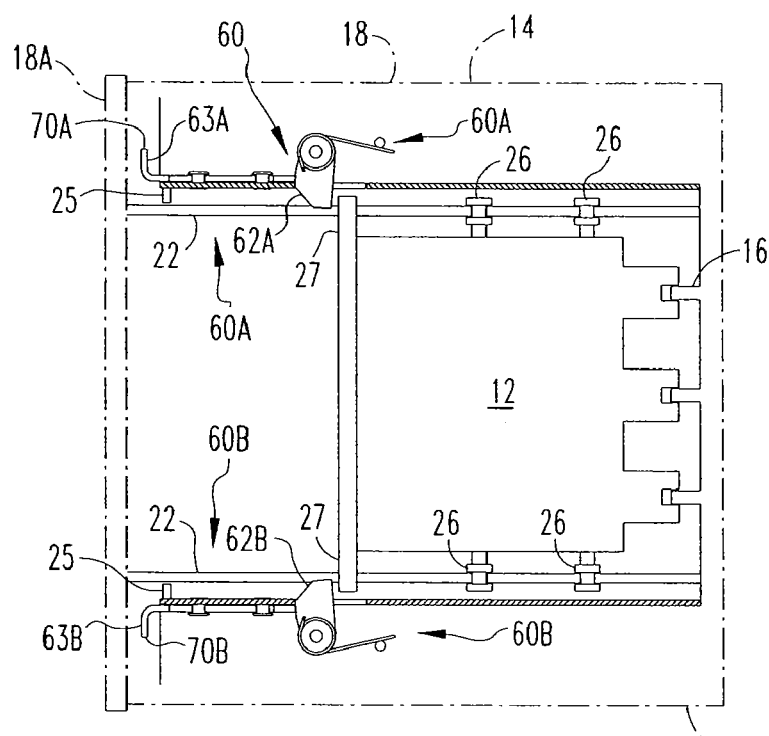
FIG. 1A is a schematic view of a stop device in a first, extended position.
Figure 1B:
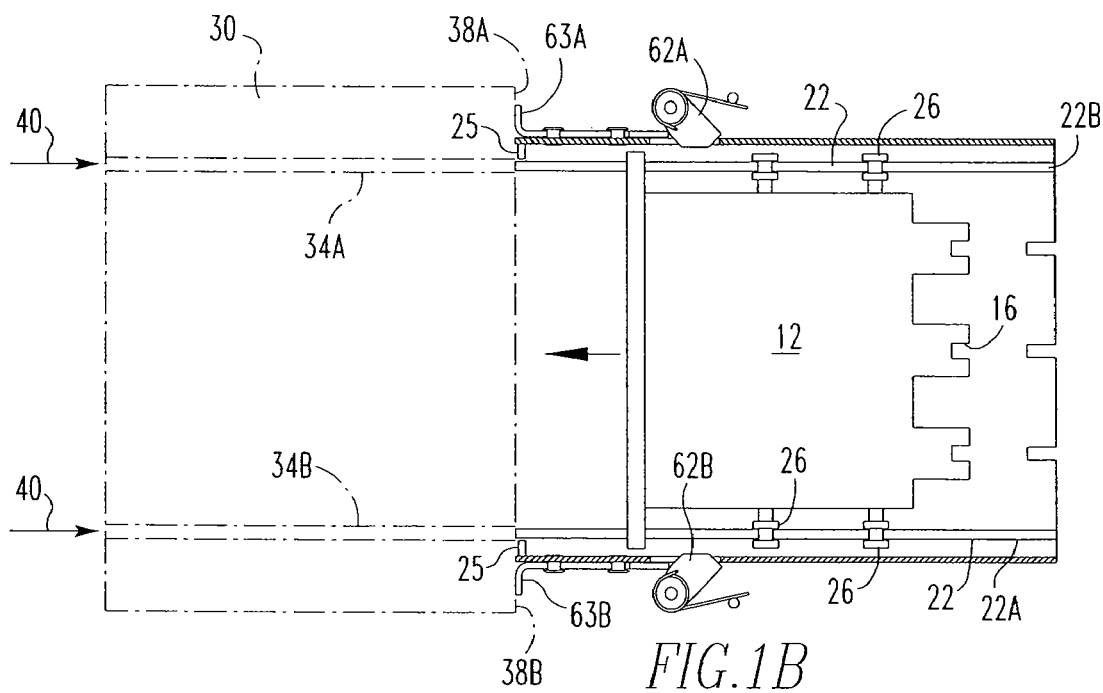
FIG. 1B is a schematic view of a stop device in a second, withdrawn position.
Figure 1C:
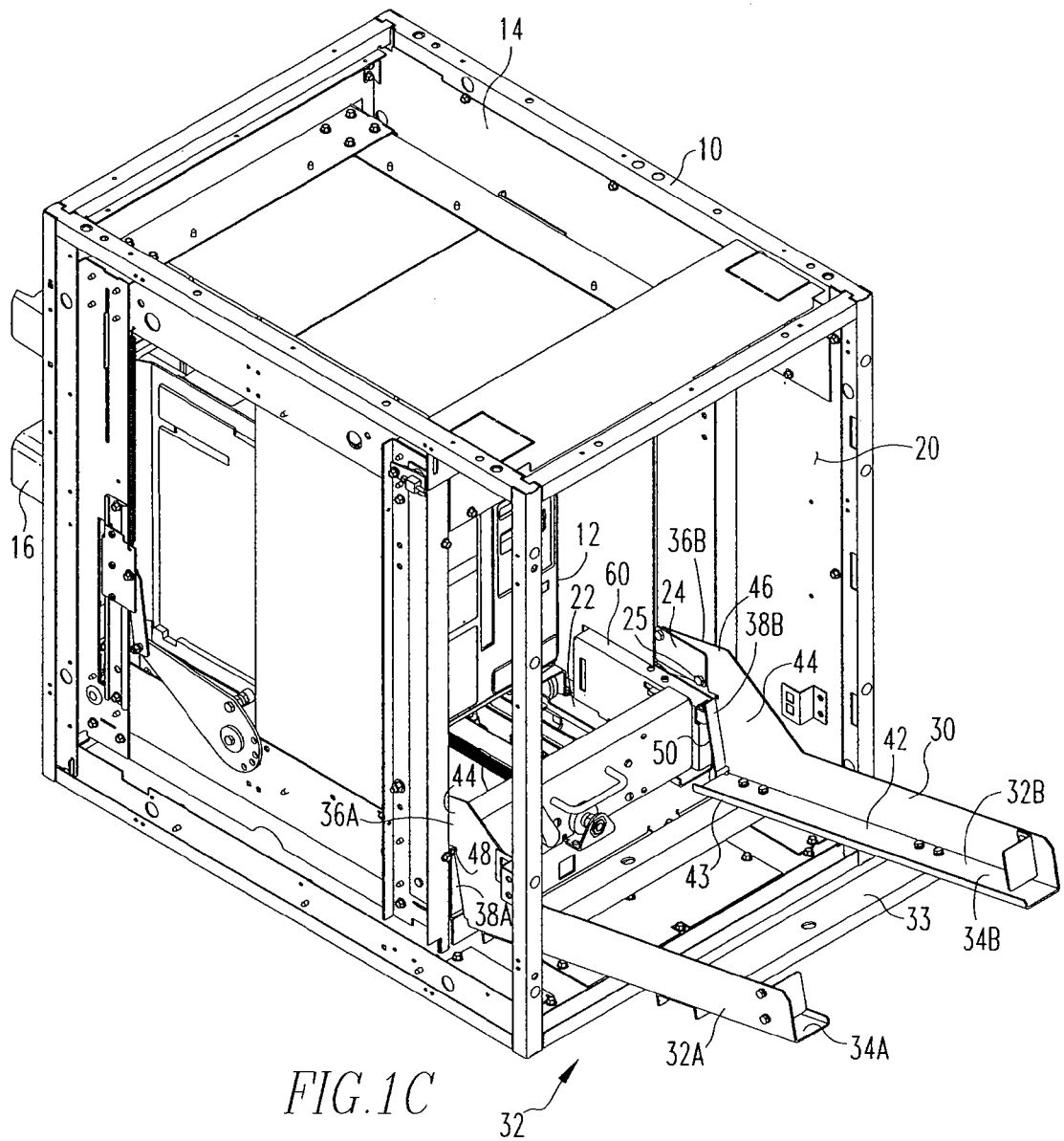
FIG. 1C is an isometric view of one embodiment of a rail extension assembly.
Figure 3:
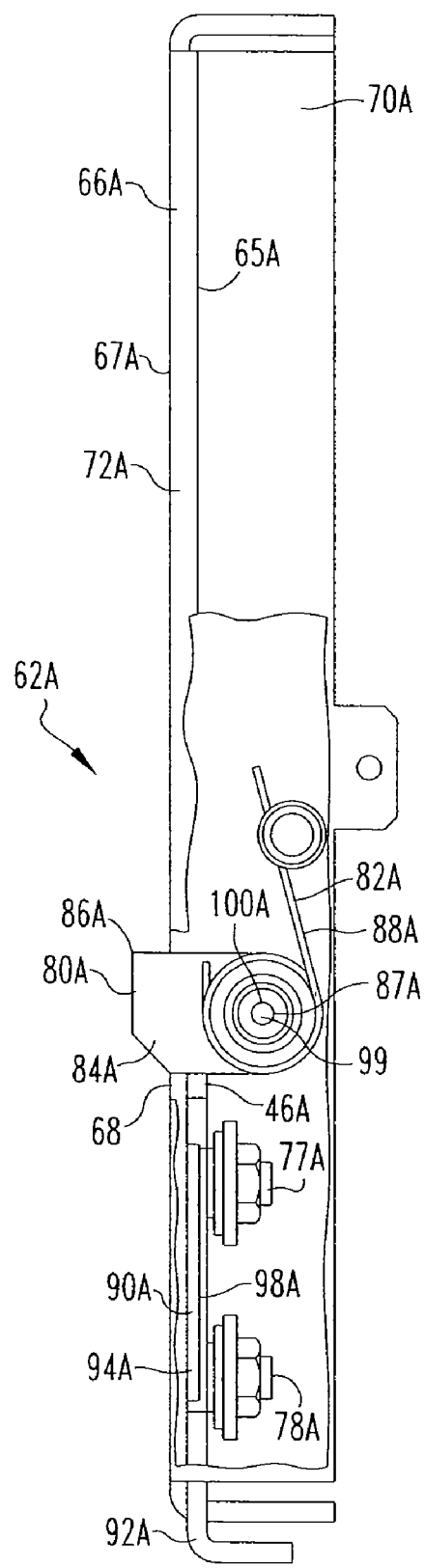
FIG. 3 is a partially cutaway top view of a stop device assembly.

As shown in FIGS. 1A-1B, a cell 10 for a drawout electrical device 12 includes a housing assembly 14 and a bus assembly 16. The bus assembly 16 is coupled to both a power source (not shown) and a load device (not shown). The housing assembly 14 includes a plurality of sidewall members 18 defining an enclosed space 20. At least one sidewall member 18A is movable, or removable, thereby allowing access to the enclosed space 20. Typically, the movable sidewall member 18A is disposed on the front side of the housing assembly 14. The bus assembly 16 is, typically, disposed opposite the front side of the housing assembly 14. The housing assembly 14 also includes a pair of elongated rails 22 (FIG. 1B), a first rail 22A and a second rail 22B. The housing assembly rails 22 extend from the front side of the housing assembly 14 toward the back side of the housing assembly 14. Additionally, adjacent to each housing assembly rail 22A, 22B is a rail extension assembly mounting device 24 (FIG. 1C). As shown, the rail extension assembly mounting device 24 extends into the enclosed space 20. The drawout electrical device 12 includes a plurality of wheels 26, typically two wheels 26 on each side of the drawout electrical device 12, structured to engage the housing assembly rails 22A, 22B. The drawout electrical device 12 also includes a stop edge 27. As shown schematically, the drawout electrical device stop edge 27 is the front edge of the drawout electrical device 12, however, any generally vertical edge on the drawout electrical device 12 may be a stop edge.

As shown in FIG. 1C, a rail extension assembly 30 is structured to be coupled to the housing assembly 14. The rail extension assembly 30 may be incorporated into a movable cart (not shown) structured to remove the drawout electrical device 12 from the cell 10. As shown, the rail extension assembly 30 is an independent device structured to allow the drawout electrical device 12 to be moved out of the cell 10, i.e., for maintenance or testing, and then reinstalled, as described below. The rail extension assembly 30, preferably, includes a pair of rails 32, that is, a first rail 32A and a second rail 32B. The rail extension assembly pair of rails 32 may be coupled together and held in a spaced relation by a frame member 33, as shown, or may be separate units (not shown). Each rail extension assembly rail 32A, 32B includes a rail surface 34A, 34B, a coupling device 36A, 36B, and a permissive member actuator 38A, 38B. Preferably, each rail surface 34A, 34B has the same general shape as the housing assembly rails 22.

Each rail extension assembly rail 32A, 32B is a generally flat, elongated horizontal member 42 having a front side 43. The horizontal member front side 43 is structured to be disposed adjacent to the housing assembly 14. The horizontal member 42, preferably, has a length that is about the same as the length of the housing assembly rails 22. Each coupling device 36A, 36B is, preferably, a generally flat, vertical member 44 extending from the outer side of the associated horizontal member 42. Each vertical member 44 includes a vertical member extension 46 that extends beyond the horizontal member front side 43. The vertical member extension 46 includes a downwardly opening notch 48A, which may taper from wide to narrow, structured to engage the rail extension assembly mounting post 25. Each vertical member 44 may extend along the length of the associated horizontal member 42 to provide support and to guide the wheels 26 of the drawout electrical device 12. Each permissive member actuator 38A, 38B is, preferably, a generally flat, vertical plate 50 extending generally perpendicular from the associated vertical member 44. The permissive member actuator plate 50 is disposed generally at the associated horizontal member front side 43. The permissive member actuator plate 50 extends over a portion of the associated horizontal member 42, but does not substantially block, that is, extend across, the associated horizontal member 42.

When the rail extension assembly pair of rails 32 is coupled to the housing assembly 14 and aligned with the housing assembly pair of rails 22, the rail extension assembly pair of rails 32 and the housing assembly pair of rails 22 form a substantially continuous track 40. That is, each rail extension assembly rail 32A, 32B is aligned with the associated housing assembly rail 22A, 22B. In this configuration, the drawout electrical device 12 may be moved, that is, rolled along the track 40, between a first, installed position and a second, drawn out position.

At least one stop device assembly 60 is disposed within the housing assembly 14. Where the rail extension assembly 30 includes two separate units, i.e. not held in a spaced relationship by frame member 33, there are two stop device assemblies 60A, 60B with one stop device assembly 60A, 60B disposed adjacent to each housing assembly rail 22A, 22B. The stop device assemblies 60A, 60B are generally similar, but are mirror images of each other. Accordingly, only one stop device assembly 60A will be described below, however, it is understood that a second stop device assembly 60B may exist. The components of the first stop device assembly 60A shall be identified by a reference number followed by the letter "A." Like components of a second stop device assembly 60B are identified by like reference number followed by the letter "B."

The stop device assembly 60A includes a stop member assembly 62A, a permissive member 63A, and a mounting assembly 64A. The stop device assembly mounting assembly 64A is, preferably, a generally flat, rectangular plate 66A having a first, inner side 65A and a second, outer side 67A. The stop device mounting assembly plate 66A has an opening 68A and at least one generally perpendicular edge 70A. The stop device mounting assembly plate at least one perpendicular edge 70A, preferably, extends along the upper longitudinal edge 72A of the stop device mounting assembly plate 66A and extends beyond the stop device mounting assembly plate second, outer side 67A. The stop device mounting assembly plate lower longitudinal edge 74A may include mounting tabs 76A. The stop device mounting assembly plate 66A also includes a pair of horizontally aligned mounting pins 77A, 78A extending generally perpendicular from the stop device mounting assembly plate second, outer side 67A. The stop device mounting assembly plate at least one perpendicular edge 70A includes at least one pivot pin opening 79A disposed adjacent to the stop device mounting assembly plate opening 68A.

The stop member assembly 62A includes a stop member 80A and a biasing device 82A. The stop member 80A has a generally flat body 84A. The stop member body 84A may be rectangular but, in a preferred embodiment, one end of the stop member body 84A is generally circular and one of the remaining corners of the stop member body 84A is truncated. The single remaining right angle corner is a stop edge 86A. The stop member body 84A has an opening 87A, preferably disposed at about the center of the circular end. The biasing device is, preferably, a spring 88A.

The permissive member 63A includes a generally flat, elongated body 90A. The permissive member body 90A has a first end 92A, a medial portion 94A, and a second end 96A. An elongated, longitudinal opening 98A is disposed along the permissive member body medial portion 94A. The permissive member body first end 92A may extend generally perpendicular to the permissive member body medial portion 94A. The permissive member body second end 96A is structured to engage the stop member 80A.

The stop device assembly 60A is assembled as follows. The permissive member body 90A is movably coupled to the stop device mounting assembly plate 66A with the stop device mounting assembly plate mounting pins 77A, 78A extending through the permissive member body longitudinal opening 98A. The mounting pins 77A, 78A preferably have a locking device, such as a cap or a nut, structured to maintain the permissive member 63A on the mounting pins 77A, 78A. The permissive member body longitudinal opening 98A is longer than the spacing between the mounting pins 77A, 78A. In this configuration, the permissive member 63A may move horizontally as described below. The stop member 80A is pivotally coupled to the stop device mounting assembly plate 66A by a pivot pin 99 extending through the stop device mounting assembly plate at least one pivot pin opening 79A. The pivot pin 99 also extends through the stop member opening 87A. The stop member 80A extends through the stop device mounting assembly plate opening 68A so that the stop member stop edge 86A is disposed on the stop device mounting assembly plate first, inner side 65A. In this configuration, the permissive member 63A moves between a first position, wherein the permissive member 63A does not effect the position of the stop member 80A, and a second position, wherein the permissive member 63A moves the stop member 80A into a second, withdrawn position, as described below.

The stop device assembly 60A is coupled to the housing assembly 14 adjacent to the front side of the housing assembly 14. Preferably, the stop device assembly 60A is disposed over a portion of the housing assembly rail 22A. The stop device assembly 60A width is slender enough to allow the drawout electrical device wheels 26 to pass thereby without contacting the stop device assembly 60A. In this configuration, the stop member 80A is structured to move between a first, extended position, wherein the stop member 80A engages the drawout electrical device 12 and prevents the drawout electrical device 12 from moving from the first, installed position to the second, drawn out position, and a second, withdrawn position, wherein the stop member 80A does not engage the drawout electrical device 12 and the drawout electrical device 12 may move from the first, installed position to the second, drawn out position. That is, in operation, the biasing device 82A will normally bias the stop member 80A to a first, extended position. When the stop member 80A is in the first, extended position and the drawout electrical device 12 is moved toward the front of the housing assembly 14, the stop member stop edge 86A engages the drawout electrical device stop edge 27 and prevents the drawout electrical device 12 from moving. When a rail extension assembly 30 is properly coupled to the housing assembly 14, the rail extension assembly permissive member actuator plate 50 engages the permissive member body first end 92A and, during the installation of the rail extension assembly 30, the permissive member 63A moves from the permissive member 63A first position to the permissive member 63A second position. The permissive member 63A, in turn, moves the stop member 80A from the stop member 80A first, extended position to the stop member 80A second, withdrawn position. Accordingly, when the rail extension assembly 30 is properly coupled to the housing assembly 14, the drawout electrical device 12 may be moved from the first, installed position to the second, drawn out position.

Figure 4A:
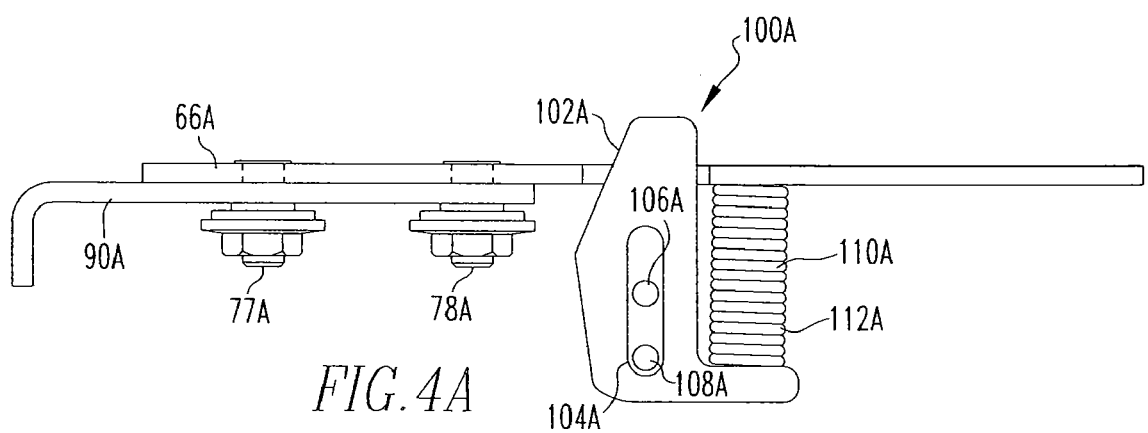
FIG. 4A is a schematic view of a stop device in a first, extended position of an alternate embodiment.
Figure 4B:
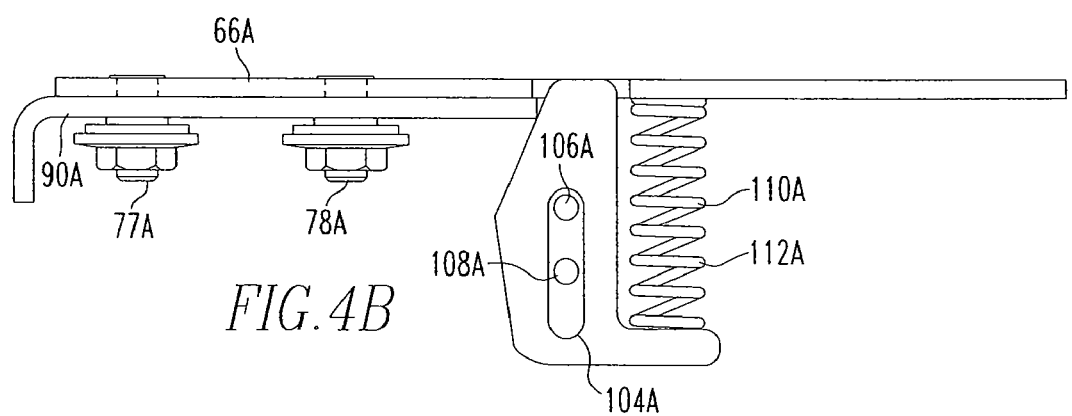
FIG. 4B is a schematic view of a stop device in a first, extended position of an alternate embodiment.

In another embodiment, a stop member 100A slides or translates, that is, moves without changing its orientation, from the stop member 100A first position to the stop member 100A second position. That is, as shown in FIG. 4, the stop member 100A includes a cam surface 102A and an elongated medial slot 104A. The stop member 100A is coupled to the stop device mounting assembly plate perpendicular edge 70A in a manner similar to the permissive member 63A. That is, the stop device mounting assembly plate perpendicular edge 70A includes a pair of aligned mounting pins 106A, 108A. The stop member medial slot 104A is longer than the spacing of the stop member mounting pins 106A, 108A. As such, the stop member 100A may slide between the first, extended position and the second, withdrawn position. A biasing device 110A, such as a tension spring 112A, extends between the stop member 100A and the stop device mounting assembly plate 66A, and is structured to bias the stop member 100A to the first, extended position. When the permissive member 63A moves to the permissive member 63A second position, the permissive member second end 96A engages the stop member cam surface 102A. The permissive member 63A is structured to engage the cam surface 102A at an angle of more than about 25 degrees from normal to the cam surface 102A.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A stop device for an electrical device cell, said electrical device cell having a housing assembly defining an enclosed space, said housing assembly having a front side that may be opened, a pair of rails disposed within said enclosed space, said rails extending in a generally parallel, spaced relation and terminating at said housing assembly front side, a drawout electrical device movably disposed on said rails, said drawout electrical device structured to move between a first, installed position and a second, drawn out position, and a rail extension assembly, said rail extension assembly structured to be coupled to said housing assembly and aligned with said housing assembly rails so that said housing assembly rails and said rail extension assembly form a track extending from within said housing assembly to a point outside said housing assembly, said stop device comprising:

a stop member assembly having a stop member, said stop member coupled to said housing assembly adjacent to at least one said housing assembly rail, said stop member structured to move between a first, extended position, wherein said stop member engages said drawout electrical device and prevents said drawout electrical device from moving from said first, installed position to said second, drawn out position, and a second, withdrawn position, wherein said stop member does not engage said drawout electrical device and said drawout electrical device may move from said first, installed position to said second, drawn out position;

a permissive member movably coupled to said housing assembly adjacent to said stop member, said permissive member having a first end and a second end;

said permissive member first end structured to be engaged by said rail extension assembly;

said permissive member second end structured to engage said stop member;

said permissive member structured to move between a first position, wherein said permissive member does not effect the position of the stop member, and a second position, wherein said permissive member moves said stop member into said second, withdrawn position; and wherein, when said rail extension assembly is installed on said housing assembly, said rail extension assembly engages said permissive member first end and moves said permissive member to said permissive member second position.

2. The stop device of claim 1 wherein said stop member pivots between said first, extended position and said second, withdrawn position.

3. The stop device of claim 2 wherein said stop member includes a stop edge that, when said stop member is in said first, extended position, said stop edge extends generally perpendicular to the longitudinal axis of said housing assembly rails.

4. The stop device of claim 2 wherein:
said stop member assembly includes a biasing device; and
said biasing device structured to engage said stop member and bias said stop member to said first, extended position.

5. The stop device of claim 2 wherein said rail extension assembly includes a generally horizontal rail surface, a generally vertical member extending from one edge of said rail surface, and a permissive member actuator extending generally perpendicular to said vertical member, and wherein:

said permissive member is an elongated member with a longitudinal axis extending generally parallel the longitudinal axis of said housing assembly rails; and said permissive member first end extends in a direction generally perpendicular to the permissive member longitudinal axis.

6. The stop device of claim 1 wherein:
said stop member slides between said first, extended position and said second, withdrawn position;
said stop member having a cam surface, said cam surface being generally angled relative to the direction of travel of said stop member; and
said permissive member structured to engage said cam surface at an angle of more than about 25 degrees from normal to the cam surface.

7. A stop device assembly for an electrical device cell, said electrical device cell having a housing assembly defining an enclosed space, said housing assembly having a front side that may be opened, a pair of rails disposed within said enclosed space, said rails extending in a generally parallel, spaced relation and terminating at said housing assembly front side, a drawout electrical device movably disposed on said rails, said drawout electrical device structured to move between a first, installed position and a second, drawn out position, and a rail extension assembly, said rail extension assembly structured to be coupled to said housing assembly and aligned with said housing assembly rails so that said housing assembly rails and said rail extension assembly form a track extending from within said housing assembly to a point outside said housing assembly, said stop device assembly comprising:

a mounting assembly having an elongated plate, said mounting assembly structured to be coupled to said housing assembly with said elongated plate extending adjacent to one said housing assembly rail;

a stop member assembly having a stop member, said stop member coupled to said mounting assembly plate, said stop member structured to move between a first, extended position, wherein said stop member engages said drawout electrical device and prevents said drawout electrical device from moving from said first, installed position to said second, drawn out position, and a second, withdrawn position, wherein said stop member does not engage said drawout electrical device and said drawout electrical device may move from said first, installed position to said second, drawn out position;

a permissive member movably coupled to said mounting assembly adjacent to said stop member, said permissive member having a first end and a second end;

said permissive member first end structured to be engaged by said rail extension assembly;

said permissive member second end structured to engage said stop member;

said permissive member structured to move between a first position, wherein said permissive member does not effect the position of the stop member, and a second position, wherein said permissive member moves said stop member into said second, withdrawn position; and wherein, when said rail extension assembly is installed on said housing assembly, said rail extension assembly engages said permissive member first end and moves said permissive member to said permissive member second position.

8. The stop device assembly of claim 7 wherein:
said mounting assembly plate has a first side, a second side, and an opening, said plate first side disposed adjacent to at least one housing assembly rail;

said stop member being pivotally coupled to said mounting assembly plate second side adjacent to said opening; and said stop member structured pivots between said first, extended position, wherein said stop member extends through said opening, and said second, withdrawn position, wherein said stop member does not extend over said mounting assembly plate first side.

9. The stop device assembly of claim 8 wherein said stop member includes a stop edge that, when said stop member is in said first, extended position, said stop edge extends generally perpendicular to said mounting assembly plate.

10. The stop device assembly of claim 8 wherein:
said stop member assembly includes a biasing device; and
said biasing device structured to engage said stop member and bias said stop member to said first, extended position.

11. The stop device assembly of claim 10 wherein said biasing device is a coil spring.

12. The stop device assembly of claim 8 wherein said rail extension assembly includes a generally horizontal rail surface, a generally vertical member extending from one edge of said rail surface, and a stop device tab extending generally perpendicular to said vertical member, and wherein:
said permissive member is an elongated member with a longitudinal axis extending generally parallel the longitudinal axis of said housing assembly rails; and
said permissive member first end extends in a direction generally perpendicular to the permissive member longitudinal axis.

13. The stop device assembly of claim 12 wherein:
said permissive member includes a generally flat medial portion disposed between said first end and said second end;
said medial portion having an elongated slot;
said mounting assembly plate has two horizontally aligned mounting pins disposed adjacent to said stop member;
said permissive member being coupled to said mounting assembly plate with said mounting pins extending through said permissive member medial portion elongated slot; and
wherein said permissive member moves in a generally linear manner.

14. A cell for a drawout electrical device, said cell structured to accommodate a drawout electrical device, said drawout electrical device having a plurality of wheels, said cell comprising:
a housing assembly having a plurality of sidewalls defining an enclosed space, said housing assembly having a front side wherein said front side sidewall may be opened, a pair of rails disposed within said enclosed space, said rails extending in a generally parallel, spaced relation and terminating at said housing assembly front side, said rails structured to movably support said drawout electrical device wheels;
a rail extension assembly, said rail extension assembly structured to be coupled to said housing assembly and aligned with said housing assembly rails so that said housing assembly rails and said rail extension assembly form a track extending from within said housing assembly to a point outside said housing assembly;
said drawout electrical device structured to move on said track between a first, installed position, wherein said drawout electrical device is disposed within said housing assembly, and a second, drawn out position, wherein said drawout electrical device is disposed on said rail extension assembly outside of said housing assembly;

a stop device having a stop member assembly and a permissive member;

said stop member assembly having a stop member, said stop member coupled to said housing assembly adjacent to at least one said housing assembly rail, said stop member structured to move between a first, extended position, wherein said stop member engages said drawout electrical device and prevents said drawout electrical device from moving from said first, installed position to said second, drawn out position, and a second, withdrawn position, wherein said stop member does not engage said drawout electrical device and said drawout electrical device may move from said first, installed position to said second, drawn out position;

said permissive member movably coupled to said housing assembly adjacent to said stop member, said permissive member having a first end and a second end;

said permissive member first end structured to be engaged by said rail extension assembly;

said permissive member second end structured to engage said stop member;

said permissive member structured to move between a first position, wherein said permissive member does not effect the position of the stop member, and a second position, wherein said permissive member moves said stop member into said second, withdrawn position; and wherein, when said rail extension assembly is installed on said housing assembly, said rail extension assembly engages said permissive member first end and moves said permissive member to said permissive member second position.

15. The cell of claim 14 wherein said stop member pivots between said first, extended position and said second, withdrawn position.

16. The cell of claim 15 wherein said stop member includes a stop edge that, when said stop member is in said first, extended position, said stop edge extends generally perpendicular to the longitudinal axis of said housing assembly rails.

17. The cell of claim 15 wherein:
said stop member assembly includes a biasing device; and
said biasing device structured to engage said stop member and bias said stop member to said first, extended position.

18. The cell of claim 15 wherein said rail extension assembly includes a generally horizontal rail surface, a generally vertical member extending from one edge of said rail surface, and a stop device tab extending generally perpendicular to said vertical member, and wherein:
said permissive member is an elongated member with a longitudinal axis extending generally parallel the longitudinal axis of said housing assembly rails; and
said permissive member first end extends in a direction generally perpendicular to the permissive member longitudinal axis.

19. The cell of claim 14 wherein:
said stop member slides between said first, extended position and said second, withdrawn position;
said stop member having a cam surface, said cam surface being generally angled relative to the direction of travel of said stop member; and
said permissive member structured to engage said cam surface at an angle of more than about 25 degrees from normal to the cam surface.

* * * * *